United States Patent [19]

Campbell et al.

[11] Patent Number: 5,172,796

[45] Date of Patent: Dec. 22, 1992

[54] REDUCED COST VISCOUS COUPLING BY-PASS ELEMENT FOR A TORQUE CONVERTER

[75] Inventors: Lester Campbell, Battle Creek; Edward Bojas, Marshall; Edward Goscenski, Battle Creek, all of Mich.

[73] Assignee: Eaton Corporation, Cleveland, Ohio

[21] Appl. No.: 853,560

[22] Filed: Mar. 18, 1992

[51] Int. Cl.⁵ .................. F16H 45/02; F16D 35/00; F16D 47/06
[52] U.S. Cl. ................... 192/3.29; 29/434; 29/889.5; 192/58 B; 192/109 F; 464/24
[58] Field of Search ............ 192/3.29, 58 B, 109 F, 192/3.28; 464/24; 29/889.5, 434

[56] References Cited

U.S. PATENT DOCUMENTS

| | | | |
|---|---|---|---|
| 4,172,510 | 10/1979 | Forkel | 74/574 X |
| 4,317,510 | 3/1982 | Staub | 192/3.29 X |
| 4,423,803 | 1/1984 | Malloy | 192/3.29 |
| 4,462,492 | 7/1984 | Mueller | 192/3.29 |
| 4,576,259 | 3/1986 | Bopp | 192/3.21 |
| 4,840,262 | 6/1989 | Herrmann | 192/106.2 |
| 4,874,074 | 10/1989 | Damon et al. | 464/24 X |
| 4,936,434 | 6/1990 | Clancey | 464/24 X |
| 4,962,838 | 10/1990 | Clancey | 464/24 X |
| 4,963,119 | 10/1990 | Graton | 464/24 |

Primary Examiner—Rodney H. Bonck
Attorney, Agent, or Firm—L. J. Kasper

[57] ABSTRACT

A viscous coupling (11) is disclosed of the type used as a by-pass element is a torque converter assembly (T) including a torque converter housing (H) and an output shaft (S). The coupling includes a body member (13), a cover member (15), and an annular clutch assembly (19). The clutch assembly includes a pair of clutch plates (53 and 57), splined to a mounting portion (37), and the coupling housing includes a housing plate (59), disposed between the clutch plates. The housing plate (59) has an outer portion (61) which is fixed between the body and cover members. Also disclosed is an assembly and fluid fill method which eliminates the need for fill holes and plugs or balls being pressed into the fill holes. The disclosed coupling requires substantially less machining than prior art viscous coupling, and therefore, has substantially reduced manufacturing cost.

21 Claims, 4 Drawing Sheets

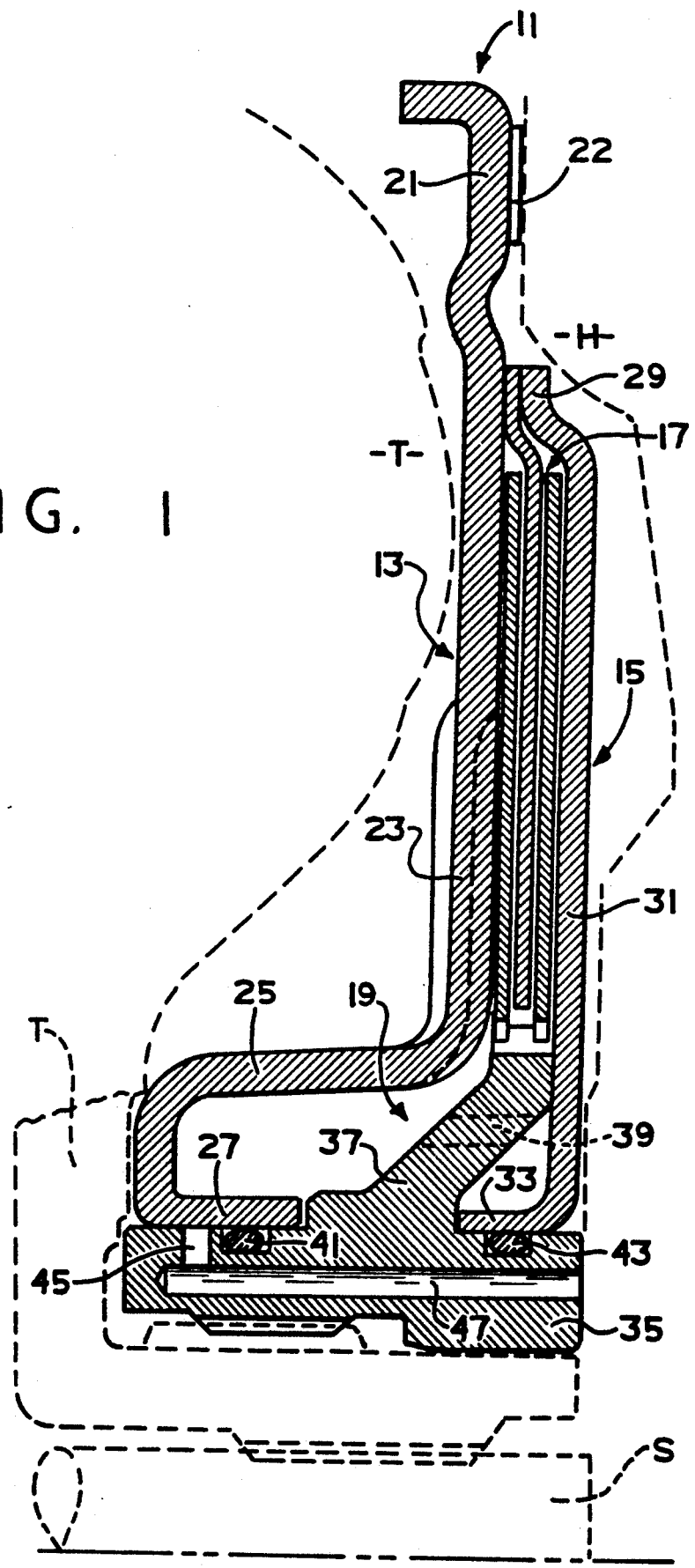

REDUCED COST VISCOUS COUPLING BY-PASS ELEMENT FOR A TORQUE CONVERTER

BACKGROUND OF THE DISCLOSURE

The present invention relates to viscous couplings, and more particularly, to such couplings of the type which are now employed in automatic transmission torque converters, to serve as by-pass elements, by-passing the torque converter.

Torque converter type automatic transmissions have achieved widespread application and acceptance in motor vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to by-pass the torque converter with some type of relatively direct drive, which typically is activated when the vehicle is operating in the higher gear ratios, and above a predetermine vehicle speed. Although the term "by-pass" is used in regard to this type of element, those skilled in the art will understand that the element is actually transmitting torque in parallel with the torque converter.

While such prior art direct drive by-pass arrangements have resulted in improvements in fuel economy, certain types of by-pass elements utilized have, under certain operating conditions, transmitted various driveline vibrations to the passenger compartment of the vehicles, causing degradation of the ride quality of the vehicle.

In an effort to provide a by-pass element which would not transmit driveline vibration to the passenger compartment, those skilled in the art have utilized a viscous coupling as the by-pass element. Although the use of a viscous coupling as the by-pass element does serve to minimize the transmission of driveline vibration, it is still important that the coupling be designed for maximum durability and, at the same time, be reliable and inexpensive to manufacture.

A typical prior art viscous coupling of the type to which the present invention relates is illustrated and described in U.S. Pat. No. 5,044,477, assigned to the assignee of the present invention, and incorporated herein by reference. Such couplings typically include a cast aluminum body or sidewall member, and a cast aluminum clutch member. Each of these cast aluminum members is then machined to define a plurality of annular, concentric lands and grooves, arranged so that the lands and grooves of the body and clutch are interdigitated, upon assembly thereof, to define a serpentine-shaped viscous shear space. During operation, the shear space is filled with viscous fluid, which is typically a silicone fluid, such that rotation of the body member transmits torque to the clutch member by means of viscous shear drag, as is now well known to those skilled in the viscous coupling art.

Although viscous couplings of the type described above have been quite satisfactory in operation as torque converter by-pass elements, the necessity of machining lands and grooves in both the body and clutch members has added substantially to the manufacturing cost of such couplings. One result has been a somewhat limited market application, i.e., it has not been economically feasible to utilize such viscous couplings in all automatic transmissions requiring torque converter by-pass elements.

SUMMARY OF THE INVENTION

Accordingly, it is an object of the present invention to provide a viscous coupling for use as the by-pass element of a torque converter-type (fluid coupling type) automatic transmission, wherein the viscous coupling design substantially reduces the amount of machining required, and the resultant manufacturing cost.

The above and other objects of the invention are accomplished by the provision of a viscous coupling for use as a by-pass element in a torque converter assembly including a torque converter housing and an output shaft. The viscous coupling is of the type including an annular housing assembly adapted to be positioned within the torque converter housing, and having axially spaced, radially-extending first and second annular sidewall members defining an annular viscous chamber therebetween, adapted to contain viscous fluid. The annular housing assembly defines a radially-extending annular clutching surface adapted for clutching co-action with a confronting surface of the torque converter housing. An annular clutch assembly is disposed within the viscous chamber and includes an annular, radially-extending clutch portion adapted for viscous clutching co-action with one of the first and second sidewall members, and an axially-extending clutch hub portion adapted to be drivingly associated with the output shaft of the torque converter assembly.

The improved viscous coupling is characterized by the annular clutch assembly including first and second annular, radially-extending clutch plates disposed adjacent, and adapted for viscous clutching co-action with, an adjacent surface of the first and second annular sidewall members, respectively. The first and second clutch plates are drivingly associated with the axially-extending clutch hub portion, whereby rotation of the clutch plates results in rotation of the clutch hub portion. The annular housing assembly further comprises an annular, radially-extending housing plate disposed axially between the first and second clutch plates, and adapted for viscous clutching co-action with at least one of the first and second clutch plates. The housing plate is disposed in fixed engagement with the first and second annular sidewall members at a location disposed radially outwardly of the annular viscous chamber.

BRIEF DESCRIPTION OF THE DRAWINGS

FIG. 1 is an axial cross-section, illustrating the upper half of a viscous coupling by-pass element made in accordance with the present invention.

DESCRIPTION OF THE PREFERRED EMBODIMENTS

Figure 3:
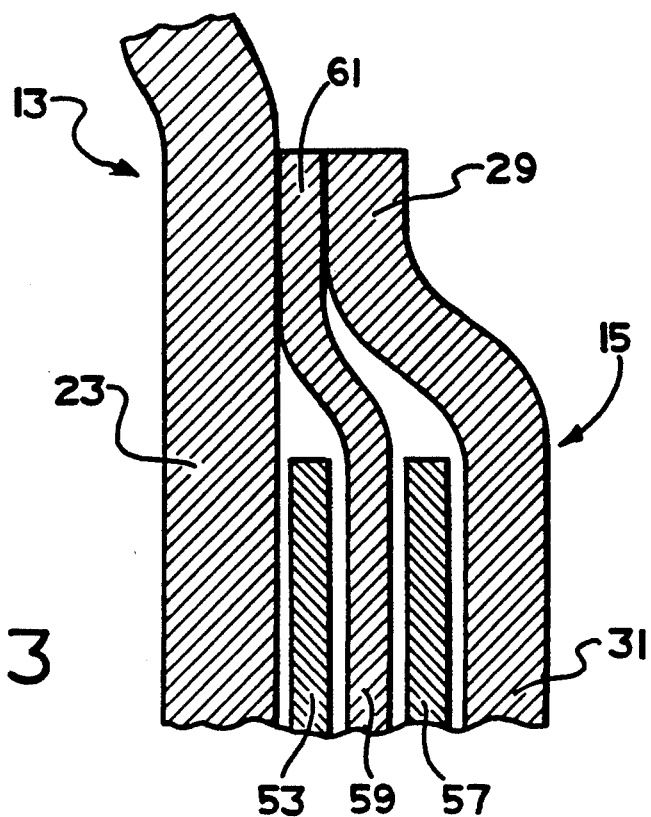
FIG. 3 is an enlarged, fragmentary, axial cross-section, similar to FIG. 1 and on the same scale as FIG. 2, illustrating another aspect of the present invention.

Referring now to the drawings, which are not intended to limit the invention, there is illustrated in FIG. 1 a viscous coupling, generally designated 11, which serves as a by-pass element in a torque converter assembly. The assembly includes a torque converter housing H, a torque converter T, and a torque converter output shaft S. The viscous coupling 11 is effective, when actuated, to provide a direct drive from the input of the torque converter housing H to the torque converter output shaft S, thus by-passing the high slippage drive path through the torque converter T.

Referring still to FIG. 1, the viscous coupling 11 of the type to which the present invention relates is generally annular, and generally planar, and is of a "sandwich" construction. The viscous coupling includes an annular housing assembly, adapted to be positioned between the torque converter T and the torque converter housing H, and having axially-spaced, annular sidewall members defining an annular clutch chamber therebetween, with an annular clutch assembly being disposed within the clutch chamber.

More specifically, one sidewall of the annular housing is constituted by a body member 13, and the other sidewall of the annular housing is constituted by a cover member 15. The body member 13 and the cover member 15 cooperate to define an annular viscous clutch chamber 17, and a clutch assembly, generally designated 19, is disposed within the clutch chamber 17. The body member 13 and the cover member 15 are preferably formed as steel stampings, while the clutch assembly 19 will be described in greater detail subsequently.

The body member 13 includes a radially outer peripheral portion 21, which includes on its forward surface (right side in FIG. 1) an annular ring of friction material 22, disposed to engage an adjacent surface of the torque converter housing H. The body member 13 further includes an intermediate sidewall portion 23, and an inner, reservoir-defining portion 25 which terminates in an axially-extending sidewall (body) hub portion 27. The cover member 15 includes a radially outer peripheral portion 29 which is attached to the intermediate sidewall portion 23 in a manner to be described subsequently. The cover member 15 further includes an intermediate sidewall portion 31, and a radially inner portion terminating in an axially-extending sidewall (cover) hub portion 33.

The clutch assembly 19 includes an annular, axially-extending clutch hub portion 35, and a generally radially-extending mounting portion 37. The mounting portion 37 preferably defines a plurality of fluid openings 39, the function of which is to permit the movement of viscous fluid from one side of the clutch assembly 19 to the other side thereof. The clutch hub portion 35 defines an upstream annular groove in which is disposed an O-ring seal 41, and a downstream annular groove in which is disposed an O-ring seal 43. The terms "upstream" and "downstream" will be understood by those skilled in the art to refer to the fact ATF (Automatic Transmission Fluid) at relatively higher pressure is applied to the chamber between the body member 13 and the torque converter T when it is desired to apply the coupling 11, whereas relatively lower pressure ATF is applied in the chamber between the cover member 15 and the housing H when it is desired to disengage the coupling 11. Therefore, the terms "upstream" and "downstream" refer to the fact that the normal flow of ATF would be from left to right in FIG. 1.

The clutch hub portion 35 further defines an annular leakage groove 45, disposed upstream from the O-ring seal 41. The groove 45 is in open communication with an axial passage 47. As is well known to those skilled in the art, it is imperative to prevent any mixing of the ATF from the torque converter T with the viscous fluid within the viscous coupling 11. Therefore, any pressurized ATF which leaks between the outer surface of the hub portion 35 and the inner surface of the hub portion 27 is collected in the leakage groove 45, and communicated from there to the downstream chamber through the passage 47. This construction is also illustrated and described in detail in above-incorporated U.S. Pat. No. 5,044,477. Some flow of ATF through the groove 45 and passage 47 is actually desirable, because such flow conducts heat away from the viscous coupling 11.

Figure 2:
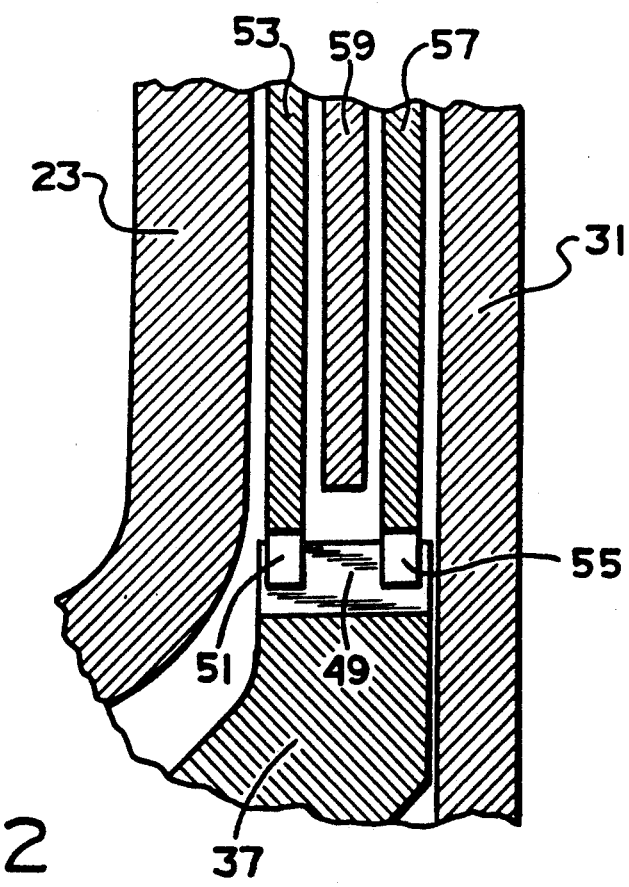
FIG. 2 is an enlarged, fragmentary, axial cross-section, similar to FIG. 1, illustrating one aspect of the present invention.

Referring now to FIG. 2, in conjunction with FIG. 1, the mounting portion 37 of the clutch assembly 19 defines a set of external splines 49. In splined engagement with the external splines 49 is a set of internal splines 51 defined at the inner periphery of a clutch plate 53. Also in engagement with external splines 49 is a set of internal splines 55 defined by the inner periphery of the clutch plate 57. Disposed axially between the clutch plates 53 and 57, but not having any engagement with the splines 49, is a housing plate 59 which will be described in greater detail subsequently.

Referring now primarily to FIG. 3, the housing plate 59 includes a radially outer portion 61 which is preferably rigidly fixed between the sidewall portion 23 of the body member 13 and the outer peripheral portion 29 of the cover member 15. It is an important aspect of the present invention that the engagement of the outer portion 61 with the body member 13 and cover member 15 be able to satisfy certain criteria. Therefore, as used hereinafter and in the appended claims, the term "operable engagement" in regard to the attachment of the outer portion 61 will be understood to mean an attachment which is fluid tight, is capable of transmitting torque of the type associated with such coupling devices, and is relatively inexpensive to manufacture.

As is mentioned in the background of the specification, one of the objects of the present invention is to provide a reduced cost viscous coupling. Therefore, it is one important feature of the present invention that the clutch plates 53 and 57, and the housing plate 59, can all be formed in a manner not requiring any machining, or any other substantial amount of processing of any type. In addition, the body member 13 and cover member 15 may also be formed in a manner not requiring any additional machining. By way of example only, the various plates 53, 57, and 59, and the members 13 and 15 may all be steel stampings.

Referring again primarily to FIG. 2, it may be seen that the radially inner extent of the housing plate 59 is not attached to, or supported by any other structure. However, the overall annular shape and the relative rigidity of the plate 59 will tend to ensure that the plate 59 maintains its desired axial position between the sidewall portion 23 and the sidewall portion 31. In addition, the clutch plates 53 and 57 are axially movable by virtue of the engagement of their internal splines to the external splines 49 and, as is well known in the art, when the chamber 17 is substantially filled with viscous fluid and the coupling 11 is rotating, the clutch plates 53 and 57 will tend to center themselves between the adjacent "housing surfaces". As used herein, the term "housing surfaces" refers to the shear surfaces defined by any portion of the housing assembly comprising the body member 13, the housing plate 59, and the cover member 15. In the same manner, the term "clutch surfaces" refers to the shear surfaces defined on either side of the clutch plates 53 and 57.

Assembly Method

Figure 4:
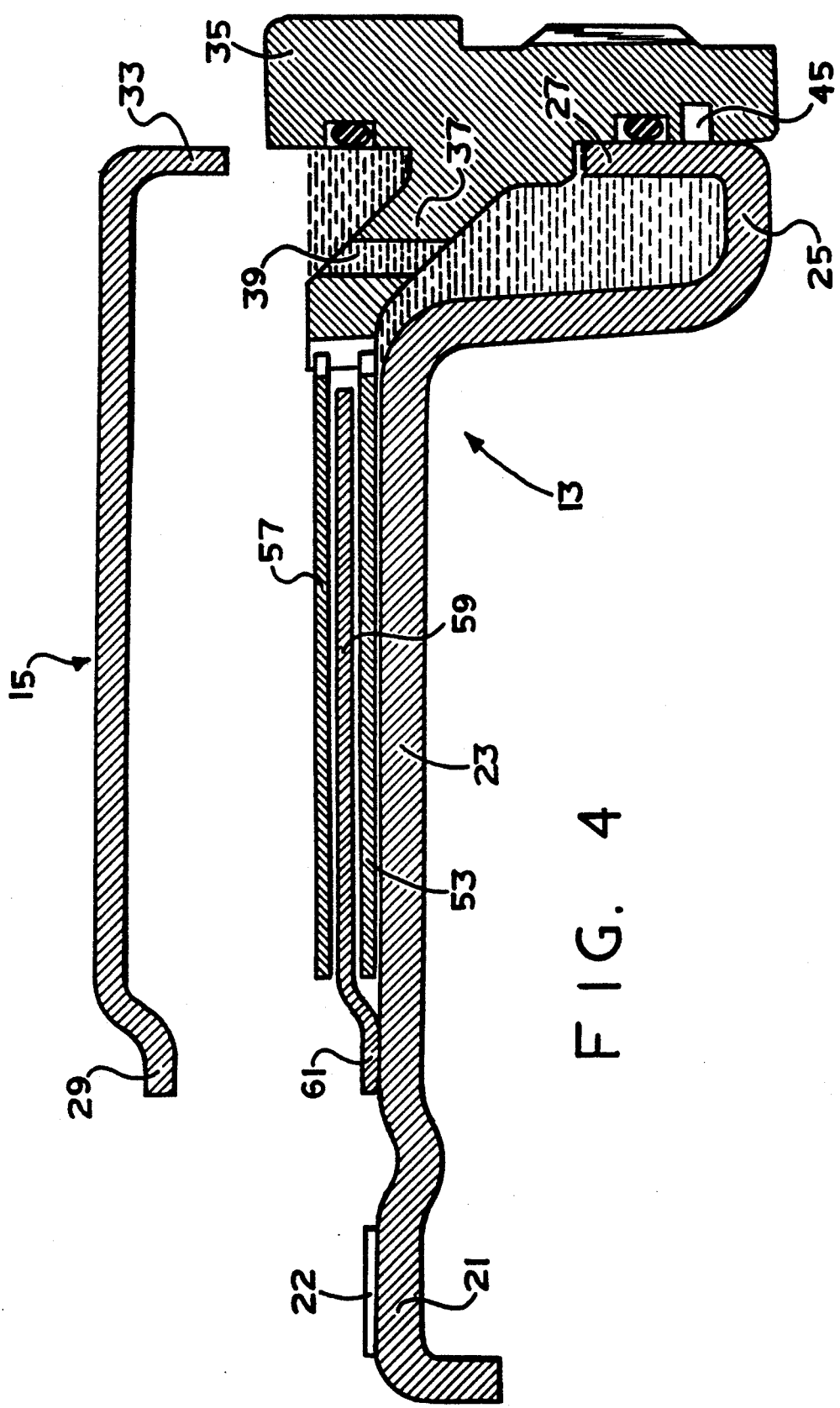
FIG. 4 is a somewhat diagrammatic view, illustrating the method of assembly of the viscous coupling, in accordance with the present invention.

Referring now to FIG. 4, another important aspect of the present invention which will be described is the method of assembling and filling the viscous coupling 11. As is known by those skilled in the art, the prior art viscous couplings of the type for use as torque converter by-pass elements have typically had one or more fill-holes through which the viscous fluid was injected after complete assembly of the coupling. Such an arrangement limits the rate of fill of the coupling and necessitates pressing a ball or plug into each of the holes, after filling is complete, to prevent any leakage of fluid out of the fill holes during operation. The prior art arrangement necessitates the additional machining of the fill holes, the installation of the plugs or balls, and still has been known to result in fluid leakage on occasion.

In accordance with the present invention, the assembly of the viscous coupling 11 is accomplished by placing the body member 13 in the position shown in FIG. 4, and then inserting the clutch hub 35 within the cylindrical hub portion 27, and in sealing engagement therewith. Subsequently, the clutch plate 53 is positioned onto the top surface of the body member 13, in splined engagement with the mounting portion 37 of the clutch. The housing plate 59 is then put in position, with the outer portion 61 engaging the surface of the sidewall portion 23. Next, the clutch plate 57 is laid on top of the housing plate 59, also in splined engagement with the mounting portion 37. It should be noted that, for ease of illustration, there are gaps shown between the clutch plate 53 and the body member 13, and between the clutch 57 and the housing plate 59, although, as mentioned previously, there would be contact during the assembly method.

Referring still to FIG. 4, after the various plates have been put into position, the viscous fluid may be introduced into the reservoir, through the fluid openings 39. Depending upon the configuration of the coupling and the total amount of fluid required, fluid may also be placed in the chamber above the mounting portion 37, as shown in FIG. 4. It is not an essential feature that the fluid filling occur after all of the plates are in position, but it is considered preferable. One reason is that, especially if the fluid fill level is fairly high, as is shown in FIG. 4, fluid will begin to flow radially outward after the filling is completed. However, it is undesirable to have fluid in the region of the outer portion 61 during the final step of assembly, which is attaching the cover member 15. Therefore, it is preferable to perform the filling after all plates are in position, and then immediately install the cover member 15.

After the coupling is filled with viscous fluid as shown in FIG. 4, the cover member 15 is brought into position with the cylindrical hub portion 33 surrounding the hub portion 35, and in tight sealing engagement therewith. When the cover member 15 is thus positioned, the peripheral portion 29 will be in engagement with the outer portion 61 of the housing plate 59, but only in loose engagement. The final step of the assembly and filling method is the attachment of the portions 29 and 61 to the sidewall portion 23 of the body member 13. Preferably, this is accomplished by means of electron beam welding, or some other suitable and permanent method of attachment, whereby the portions 29 and 61 and the body member 13 are in operable engagement.

Alternative Embodiment

Figure 6:
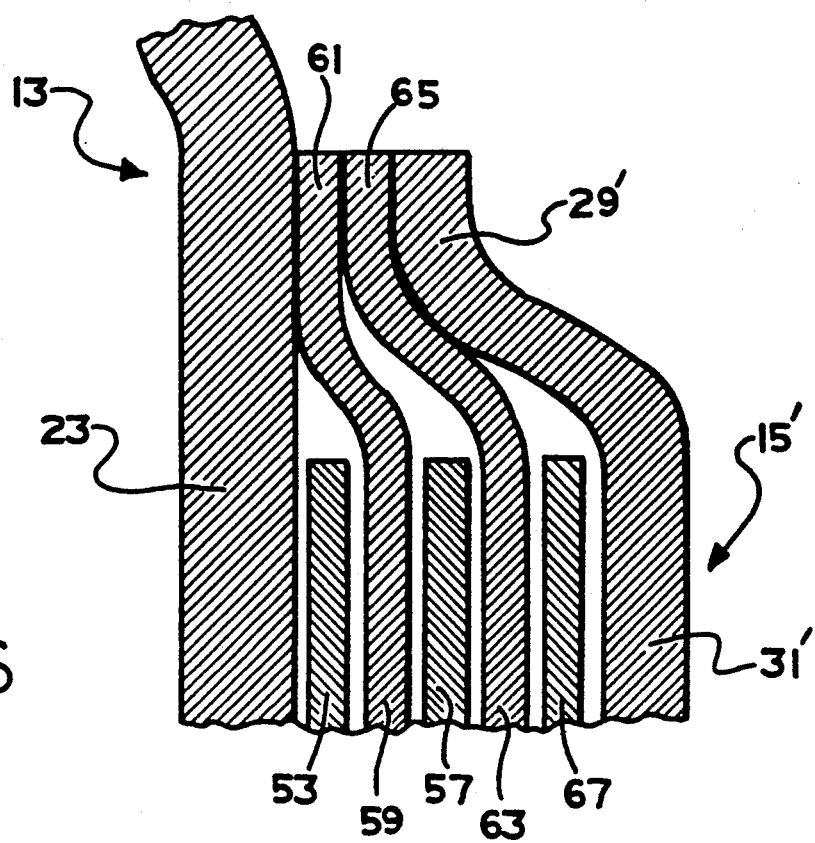
FIGS. 5 and 6 are enlarged, fragmentary, axial cross-sections, similar to FIGS. 2 and 3, respectively, illustrating an alternative embodiment of the present invention.
Figure 5:
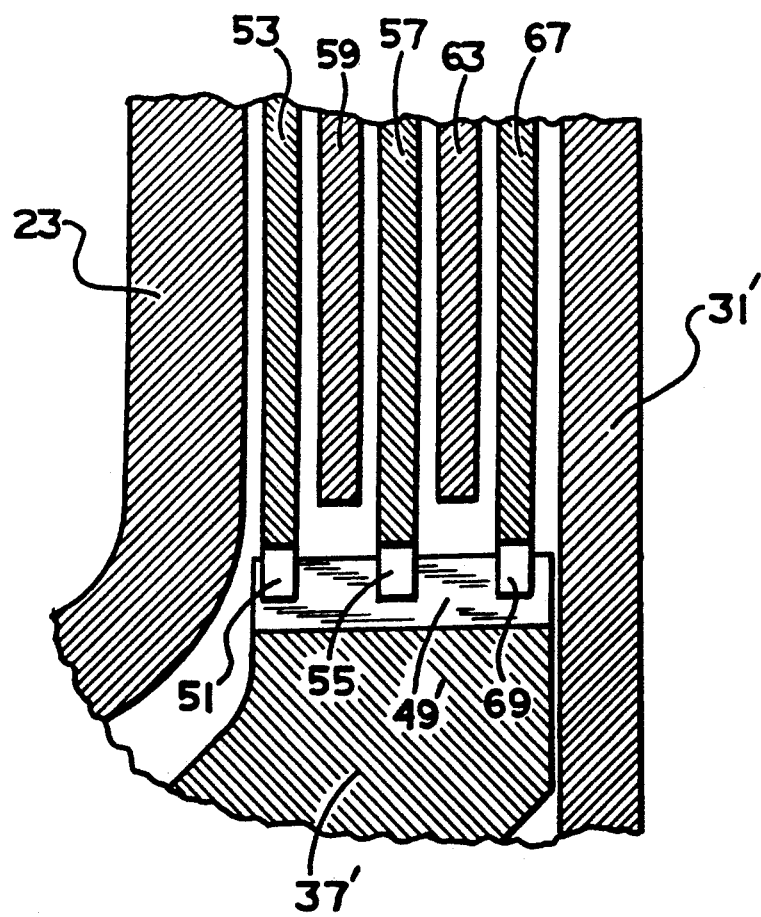

Referring now primarily to FIGS. 5 and 6, an alternative embodiment of the invention will be described. If a greater amount of torque is required than can be obtained from the embodiment of FIGS. 1 through 4, one solution is to increase the number of plates, and therefore, the total amount of viscous shear surface. The embodiment of FIGS. 5 and 6 merely indicates that the general construction of the primary embodiment can be utilized with a greater number of plates.

In the embodiment of FIGS. 5 and 6, like elements bear the same reference numerals as in the primary embodiment, modified elements bear the same reference numeral, accompanied by a prime (') mark, and new elements bear reference numerals in excess of 61.

In FIGS. 5 and 6, there is illustrated a mounting portion 37' having a greater axial extent than in the primary embodiment, the portion 37' including lengthened external splines 49'. Adjacent the clutch plate 57, the coupling includes a housing plate 63 including a radially outer portion 65. Disposed adjacent the housing plate 63 is a clutch plate 67, including a set of internal splines 69, in splined engagement with the external splines 49'. A modified cover member 15' includes a sidewall portion 31' and a radially outer peripheral portion 29', which may be fixed to the outer portions 61 and 65, and to the body member 13 in the same manner as in the connection with the primary embodiment.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A viscous coupling for use as a bypass element in a torque converter assembly including a torque converter housing and an output shaft; said viscous coupling being of the type including an annular housing assembly adapted to be positioned within the torque converter housing, and having axially spaced, radially-extending first and second annular side wall members defining an annular viscous chamber therebetween adapted to contain viscous fluid; said annular housing assembly defining a radially-extending annular clutching surface adapted for clutching co-action with a confronting surface of the torque converter housing; an annular clutch assembly disposed within said viscous chamber and including an annular, radially-extending clutch portion adapted for viscous clutching co-action with one of said first and second side wall members, and an axially-extending clutch hub portion adapted to be drivingly associated with the output shaft of the torque converter assembly; characterized by:

(a) said annular clutch portion of said clutch assembly including first and second annular, radially-extending clutch plates disposed adjacent, and adapted for viscous clutching co-action with an adjacent surface of said first and second annular side wall members, respectively;

(b) said first and second clutch plates being drivingly associated with said axially-extending clutch hub portion, whereby rotation of said clutch plates results in rotation of said clutch hub portion;

(c) said annular housing assembly further comprising an annular radially-extending housing plate disposed axially between said first and second clutch plates, and adapted for viscous clutching co-action with at least one of said first and second clutch plates; and (d) said housing plate being disposed in operable engagement with said first and second annular side wall members at a location disposed radially outwardly of said annular viscous chamber.

2. A viscous coupling as claimed in claim 1, characterized by said first and second annular side wall members and said housing plate comprising metal stampings.

3. A viscous coupling as claimed in claim 2, characterized by said housing plate including a radially outward, peripheral portion disposed in face-to-face engagement with adjacent surfaces of said first and second side wall members.

4. A viscous coupling as claimed in claim 1, characterized by said housing plate including a radially outward, peripheral portion in permanent, fluid tight engagement with said first and second side wall members.

5. A viscous coupling as claimed in claim 4, characterized by said peripheral portion of said housing plate being welded to adjacent surfaces of said first and second side wall members.

6. A viscous coupling as claimed in claim 1, characterized by said housing plate being adapted for viscous clutching co-action with both of said first and second clutch plates.

7. A viscous coupling as claimed in claim 1, characterized by said annular clutch assembly including a radially-extending hub portion drivingly associated with said axially-extending clutch hub portion, said first and second clutch plates being drivingly associated with said radially-extending hub portion.

8. A viscous coupling as claimed in claim 7, characterized by said first and second clutch plates defining sets of internal teeth and said radially-extending hub portion defining a set of external teeth, in toothed engagement with said sets of internal teeth.

9. A viscous coupling as claimed in claim 1, characterized by said first and second clutch plates comprising metal stampings.

10. A viscous coupling as claimed in claim 1, characterized by said first and second side wall members defining first and second annular, axially-extending side wall hub portions, respectively, defined at radially inner extents of said first and second side wall members, respectively, said side wall hub portions having inner peripheral surfaces journalled on an outer peripheral surface of said clutch hub portion.

11. A viscous coupling for transmitting torque between an outer housing and an input-output shaft; said viscous coupling being of the type including an annular housing assembly including means adapted for operable engagement with the outer housing, said annular housing assembly having axially-spaced, radially-extending first and second annular side wall members defining an annular viscous chamber therebetween adapted to contain viscous fluid; an annular clutch assembly disposed within said viscous chamber and including an annular, radially-extending clutch portion adapted for viscous clutching co-action with one of said first and second side wall members, and an axially-extending clutch hub portion adapted to be drivingly associated with the input-output shaft, characterized by:

(a) said annular clutch portion of said clutch assembly including a plurality $N+1$ of annular, radially-extending clutch plates, each of said clutch plates disposed adjacent, and adapted for viscous clutching co-action with at least one adjacent surface of said annular housing assembly;

(b) each of said plurality of clutch plates being drivingly associated with said axially-extending clutch hub portion, whereby rotation of said clutch plates results in rotation of said clutch hub portion;

(c) said annular housing assembly further comprising N annular radially-extending housing plates, each of said housing plates being disposed axially between a pair of adjacent ones of said plurality $N+1$ of clutch plates, and adapted for viscous clutching co-action therewith; and (d) each of said N housing plates including a radially outward peripheral portion, said N peripheral portions being disposed in fixed engagement with adjacent surfaces of said first and second side wall members, for rotation therewith.

12. A viscous coupling as claimed in claim 11, characterized by said N peripheral portions of said housing plates being disposed in permanent, fluid tight engagement with each other and with said first and second side wall members.

13. A viscous coupling as claimed in claim 11, characterized by said N peripheral portions of said housing plates being welded to each other, and to adjacent surfaces of said first and second side wall members.

14. A viscous coupling as claimed in claim 11, characterized by said annular clutch assembly including a radially-extending hub portion drivingly associated with said axially-extending clutch hub portion, each of said plurality of $N+1$ of said clutch plates being drivingly associated with said radially-extending hub portion.

15. A viscous coupling as claimed in claim 14, characterized by each of said plurality $N+1$ of said clutch plate defining a set of internal teeth and said radially-extending hub portion defining a set of external teeth, in toothed engagement with said sets of internal teeth.

16. A viscous coupling as claimed in claim 11, characterized by said first and second side wall members, said N housing plates, and said plurality $N+1$ of clutch plates comprising metal stampings.

17. A viscous coupling as claimed in claim 11, characterized by said first and second side wall members defining first and second annular, axially-extending side wall hub portions, respectively, defined at radially inner extents of said first and second side wall members, respectively, said side wall hub portions having inner peripheral surfaces journalled on an outer peripheral surface of said clutch hub portion.

18. A method of assembling and filling a viscous fluid coupling including first and second annular side wall members, said first side wall member having a reservoir-defining portion and said second side wall member having a radially outer peripheral portion; an annular clutch assembly including an axially-extending clutch hub portion and first and second clutch plates drivingly associated with said clutch hub portion; said viscous fluid coupling further including an annular radially-extending housing plate disposed axially between said first and second clutch plates for viscous clutching co-action therewith in response to the presence of viscous fluid, said housing plate including a radially outward, peripheral portion, the method comprising:

(a) positioning said first side wall member with said reservoir-defining portion oriented downwardly;

(b) locating said clutch hub portion in sealing engagement with said reservoir-defining portion of said first side wall member;

(c) positioning said first clutch plate onto said first side wall member, and in driving engagement with said clutch hub portion;

(d) positioning said housing plate above said first clutch plate with said peripheral portion in engagement with said first side wall member;

(e) positioning said second clutch plate onto said housing plate, and in driving engagement with said clutch hub portion;

(f) subsequent to step (b), introducing a predetermined volume of viscous fluid into said reservoir-defining portion of said first side wall member;

(g) positioning said second side wall member above said second clutch plate, in sealing engagement with said clutch hub portion, and with said outer peripheral portion of said second side wall member in engagement with said peripheral portion of said housing plate; and (h) fixedly attaching said peripheral portions of said second side wall member and said housing plate to said first side wall member.

19. A method as claimed in claim 18, characterized by performing step (f) subsequent to performing step (e), and then performing step (g) immediately after introducing said predetermined volume of viscous fluid into said reservoir-defining portion.

20. A method of assembling and filling a viscous fluid coupling including first and second annular side wall members, said first side wall member having a reservoir-defining portion, and said second side wall member having a radially-outer peripheral portion; an annular clutch assembly including an axially-extending clutch hub portion and a plurality $N+1$ of annular, radially-extending clutch plates drivingly associated with said clutch hub portion; said viscous fluid coupling further including N annular radially-extending housing plates, each of said housing plates being disposed axially between a pair of adjacent ones of said plurality $N+1$ of clutch plates for viscous clutching co-action therewith in response to the presence of viscous fluid, each housing plate including a radially-outer peripheral portion, the method comprising:

(a) positioning said first side wall member with said reservoir-defining portion oriented downwardly;

(b) locating said clutch hub portion in sealing engagement with said reservoir-defining portion of said first side wall member;

(c) positioning one of said $N+1$ clutch plates onto said first side wall member, and in driving engagement with said clutch hub portion;

(d) positioning one of said N housing plates above the preceding one of said clutch plates, with said peripheral portion in engagement with the preceding one of said side wall member and said housing plate;

(e) positioning another one of said $N+1$ clutch plates onto said preceding housing plate, and in driving engagement with said clutch hub portion;

(f) performing steps (d) and (e) a total of N times;

(g) subsequent to step (b), introducing a predetermined volume of viscous fluid into said reservoir-defining portion of said first side wall member;

(h) positioning said second side wall member above the last of said $N+1$ clutch plates in sealing engagement with said clutch hub portion, and with said outer peripheral portion in engagement with said peripheral portion of the last of said N housing plates; and (i) fixedly attaching said peripheral portions of said second side wall member and said housing plates to said first side wall member.

21. A method as claimed in claim 20, characterized by performing step (g) subsequent to the completion of step (f) and then immediately performing step (h) upon completion of introducing said predetermined volume of viscous fluid into said reservoir-defining portion.

* * * * *